United States Patent [19]

Hulslander et al.

[11] 4,168,089
[45] Sep. 18, 1979

[54] SERVICE CONNECTOR FOR PLASTIC GAS MAIN

[75] Inventors: William L. Hulslander; Charles J. Glover, both of Bradford; Robert P. Brown, Eldred, all of Pa.

[73] Assignee: Dresser Industries, Inc., Dallas, Tex.

[21] Appl. No.: 847,873

[22] Filed: Nov. 2, 1977

[51] Int. Cl.$^2$ .......................................... F16L 41/04
[52] U.S. Cl. .................................... 285/197; 285/328
[58] Field of Search ............... 285/197, 198, 199, 328, 285/293; 137/318

[56] References Cited

U.S. PATENT DOCUMENTS

| | | | |
|---|---|---|---|
| 1,238,383 | 8/1917 | Blumenthal | 285/293 |
| 2,617,672 | 11/1952 | Nichols | 285/126 X |
| 3,077,638 | 2/1963 | Hickam | 285/363 X |
| 3,149,861 | 9/1964 | Larsson | 285/349 |
| 3,252,192 | 5/1966 | Smith | 285/367 X |
| 3,333,046 | 7/1967 | Margis | 285/349 X |
| 3,807,435 | 4/1974 | Fenster et al. | 285/197 X |

FOREIGN PATENT DOCUMENTS 1368752 10/1974 United Kingdom ..................... 285/197

OTHER PUBLICATIONS

"Dresser Style 388 Plastic Service Connector for Gas".

Primary Examiner—Thomas F. Callaghan
Attorney, Agent, or Firm—Daniel Rubin

[57] ABSTRACT

Mating halves of plastic composition form a tapping sleeve service connector for mounting a branch connection on an inservice plastic gas main. A tapping tool supported in communication with the branch outlet is provided in one of the sleeve halves. Emplaced lining the internal pipe gripping surfaces of the sleeve halves is a dual faced, open mesh, basket woven fabric containing a random distribution of particle abrasive bonded on each of the faces. The particle abrasive is of a relatively harder composition than the plastics of either the service connector or gas main to effectively penetrate or imbed in the opposed surfaces of each when the sleeve halves are assembled in place. By being imbedded in this manner the abrasive fabric acts to secure and prevent relative rotational slippage between the service connector and pipe on which it is mounted.

6 Claims, 6 Drawing Figures

U.S. Patent   Sep. 18, 1979   4,168,089
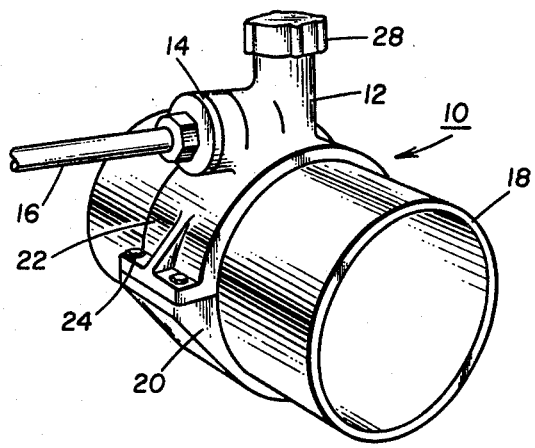
FIG. 1
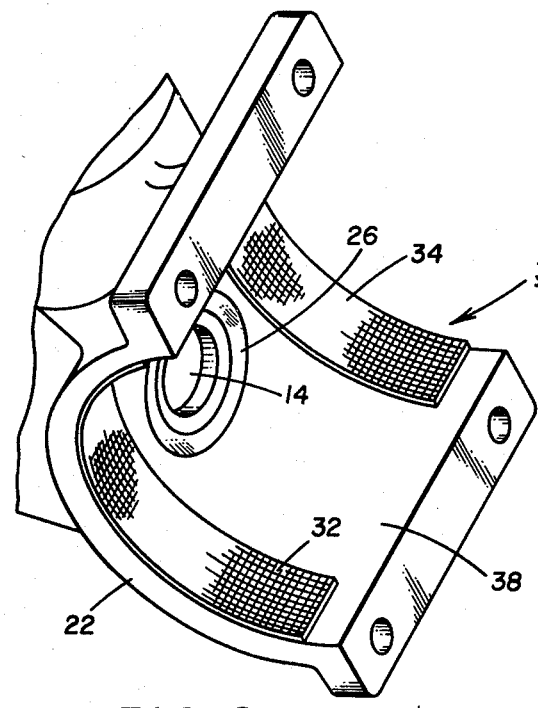
FIG. 2
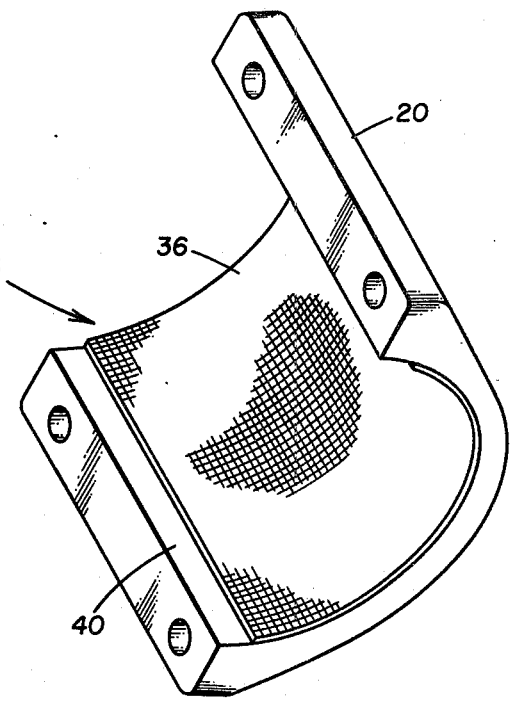
FIG. 3
FIG. 4
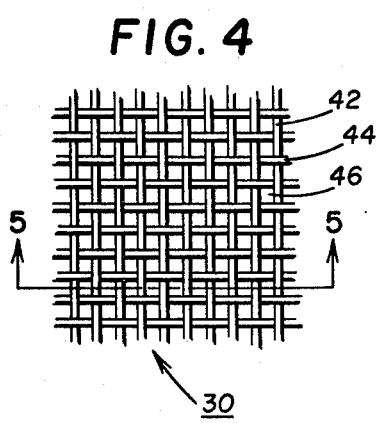
FIG. 5
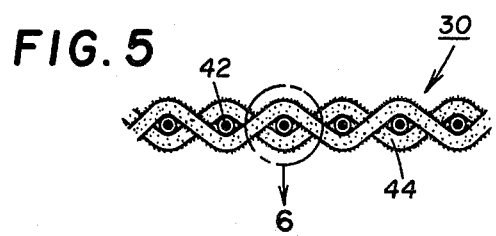
FIG. 6
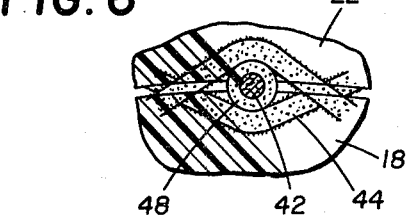

4,168,089

SERVICE CONNECTOR FOR PLASTIC GAS MAIN

CROSS REFERENCE TO RELATED APPLICATIONS

Application Ser. No. 659,810 filed Feb. 20, 1976 in the name of Thomas Pessia for "Tapping T for Plastic Pipe", now U.S. Pat. No. 4,063,844.

BACKGROUND OF THE INVENTION

1. The field of art to which the invention pertains includes the art of fluid handling as specifically directed toward tapping a pipe main under pressure.

2. Tapping sleeve service connectors for effecting a house outlet connection are available from a variety of manufacturers and are widely used for tapping gas service from underground gas mains. Typically, such tapping service connectors include a body having a side outlet house connection integral therewith and adapted for mounting in a surrounding relation onto the exterior of the pipe main. The tapping tool is threadedly supported in the body for radial advancement against the pipe wall until effecting a penetration or cutting of a removable slug by which an opening is formed that will communicate with the branch connection. Once the opening is formed it is of course essential that alignment with the tapping tool be maintained both to ensure continued gas flow through the branch opening and to provide for the eventual possibility that the tapping tool may be needed to shut off the opening.

By and large the majority of prior art applications for such tapping sleeves has included a cast or forged service connector suitable for mounting on a gas main of schedule 40 steel pipe usually of six inch diameter or larger. Conventional mounting of the sleeve onto the main usually produced a grip of magnitude sufficient to resist any slippage rotation therebetween as might be imposed by the turning moment of the branch connection. In recent years with the advent of plastic for gas service components, one or the other of the service connector or pipe has been of plastic composition. This has presented at least one relatively soft gripping surface along with a reduced coefficient of friction therebetween afforded by the substantially smooth surface finish of the plastic component. For overcoming the potential slippage of this combination it has been common to employ an intervening abrasive material such as emery cloth to secure the necessary rotational interlock. To ensure effectiveness of the emery cloth in that relationship it was necessary to prebond its smooth backside to the gripping faces of the connector sleeve.

While such prior art techniques have been generally satisfactory for achieving the gripping relation necessary to prevent rotation between metal sleeve and plastic pipe, it is generally inadequate where both the service connector and gas main are of plastic composition. That is, in the plastic-to-plastic situation both gripping surfaces are relatively flexible and smooth and lack sufficient structural rigidity to withstand a clamping force necessary to overcome the relative absence of a friction coefficient. The problem becomes increasingly acute with increase in nominal pipe size as the lateral distance between the pipe and outlet is increased thereby increasing the moment arm thereat. It is further complicated by a general inability to obtain an adequate bond of the smooth side of emery cloth to either of the gripping surfaces. Despite recognition of these problems, a ready and practical solution has not heretofore been known.

SUMMARY OF THE INVENTION

The invention relates to service connectors for plastic gas mains and more specifically to such a connector of plastic construction able to reliably afford the gripping relation necessary to be maintained between connector and pipe. This is achieved in accordance herewith by means of an abrasive liner material of predetermined surface area interposed between the contiguous gripping surfaces of connector and pipe. The liner is per se comprised of an open mesh, basket woven fabric and contains a distribution of relatively hard abrasive particles bonded to the fabric cords on both faces rather than one face of an imperforate paper surface in the manner of emery cloth. Being an open mesh, basket woven fabric, the abrasive coated cords imbed alternately in the opposing plastic surfaces of connector and pipe creating an interlock therebetween against the encountered turning moment.

It is therefore an object of the invention to provide a novel service connector of plastic composition for use on plastic gas mains.

It is another object of the invention to provide a novel service connector as in the previous object including an abrasive liner able to effect a rotational grip between connector and pipe of magnitude sufficient to withstand contemplated turning moments imposed by the branch connection.

It is a still further object of the invention to effect the foregoing objects in an effective and economical manner.

BRIEF DESCRIPTION OF THE DRAWINGS

FIG. 1 is an isometric view of the service connector hereof positioned in place on a plastic gas main;

FIGS. 2 and 3 are isometric interior views of the matching sleeve halves of the service connector;

FIG. 4 is a fragmentary plan view of the liner composition;

FIG. 5 is an enlarged sectional view taken substantially along the lines 5—5 of FIG. 4; and FIG. 6 is a fragmentary enlargement of the encircled portion 6 of FIG. 5.

Referring now to the drawings, there is illustrated in FIG. 1 a service connector tapping sleeve 10 of a type contemplated herein comprising a body 12 of generally plastic composition having an integral side outlet 14 for containing branch piping 16. The service connector is constructed for positioning atop the exterior periphery of a plastic pipe main 18 of a composition generally governed by federal regulations Title 49, Section 192, "Transportation of Natural and Other Gas by Pipeline - Minimum Safety Regulations" - Fed. Reg. Vol. 35, No. 161 and, for example, may comprise Aldyl "A" polyethylene piping marketed by duPont or PVC. Forming body 12 is a lower sleeve half 20 which can be joined to a top sleeve half 22 in a well known manner via cap screws 24. An annular gasket 26 (FIG. 2) surrounding the inlet to branch connection 14 is adapted to provide a leak-tight seal thereabout. Threadedly supported in the upper neck of body 12 beneath cap 28 is a tapping tool (not shown) of a known type as disclosed, for example, in the Pessia application cross referenced supra.

Referring now more specifically to the remaining figures, there is disclosed the liner composition utilized herein designated 30 pre-emplaced as three individual screenlike sections 32, 34 and 36 on the inside semi-circular faces 38 and 40 of sleeve halves 22 and 20, respectively. To prevent inadvertent loss during shipment and/or assembly, it is preferable to attach the individual sections in place as with a rubber cement. Liner 30 comprises a dual faced flexible screenlike open mesh abrasive cloth of a basket weave formation normally utilized for metal sanding or the like and available commercially from the 3-M Company as "Wetordry Fabricut". The manufacturer describes this abrasive cloth as "an open mesh synthetic fiber cloth construction coated with aluminum oxide or silicone carbide mineral and bonded with waterproof adhesives". A similarly suitable open mesh abrasive cloth is available under the trademark "Gritcloth".

As best seen in FIGS. 4-6, cloth 30 consists of cross cords 42 and 44 forming interstices 46 and coated throughout with an abrasive particle laden adhesive 48. The cords are of a fabric composition having a shear strength greater than that of the sandwiching plastic. Found suitable for these purposes is the Wetordry Fabricut Type 18 Grade 80 Silicon Carbide. This is a relatively coarse grip distribution with 18 cords per inch of fabric resulting in about 0.45 square inches of imbedded cloth per square inch of sandwiching plastic surface. A much greater ratio tends toward inadequate plastic surface area for resisting encountered shear forces whereas a much smaller ratio tends toward inadequate cord surface with the same result. For this material at least 5.82 square inches of liner 30 is employed per actual outside diameter of pipe 18.

When assembling body halves 20 and 22 onto pipe 18 with the liner sections in place, cap screws 24 are used to draw the halves together. In the process, the individual abrasive laden cords 42, 44 of liner cloth 30 imbed alternately into the relatively soft opposing surfaces of joint components 20 and 22 with pipe and 18 thereat, as best seen in FIGS. 5 and 6. In this manner the abrasive coated cords produce an interlock between the respective joint components against relative displacement either axially or rotationally of a magnitude much superior to that capable of being attained by prior art techniques. Since all the opposing joint surfaces are of a plastic composition, the abrasive cloth with the relatively harder grip particles imbeds itself in the opposing surfaces in a like pattern as its mesh such that tightening of screws 24 results in an assembly separation of virtual contact between the opposing sleeves definitely less than the thickness of the abrasive cloth per se. Should any distortion of the cord be incurred it tends toward an elliptical shape even further enhancing imbedment of the cord for the purposes hereof.

By the above description there is disclosed a novel improvement for a plastic service connector to be utilized on plastic pipe whereby reliability in obtaining a rotational interlock between the service connector and pipe is assured. By use of a simple yet effective liner of commercially available materials, the previous problem of slippage between the service connector and pipe, as well as the potential consequences thereof, are readily avoided in a very effective manner for overcoming a long standing problem associated therewith.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. A gas service connector for a plastic pipe main comprising a pair of sleeve halves, each being of polymerized plastic composition and axially shaped semicircular on their interiors for matched assembly mounting in an encircling relation about the pipe main, means for securing said sleeve halves assembled about the pipe main, a branch connection in one of said halves for communicating gas flow from an opening in the pipe main to outward of the service connector and a liner composition adapted to be supported sandwiched intervening between at least one of the sleeve halves and the pipe main periphery for effecting a rotational interlock thereat, said liner being comprised of an open mesh screen defined by cross cords thereof and a distribution of abrasive particles bonded about said screen cords and of a material hardness greater than the sandwiching surfaces of the sleeve halves and the pipe main engaged by said screen whereby the abrasive laden cords will imbed alternately into said sandwiching surfaces when the sleeve halves are assembled on the pipe main.

2. A gas service connector according to claim 1 in which said screen is defined by a basket weave of said cords.

3. A gas service connector according to claim 2 in which said screen cords are of a fabric having a shear strength greater than that of said sandwiching surfaces.

4. A gas service connector according to claim 3 in which said abrasive particles are comprised of at least one material selected from the group consisting of silicon carbide or aluminum oxide.

5. A gas service connector according to claim 4 in which said abrasive particles comprise silicon carbide and said liner composition is utilized in the ratio of at least about 5.82 square inches per actual inches of outside pipe diameter.

6. A gas service connector according to claim 5 in which the mesh of said liner composition results in a utilized ratio of about 0.45 square inches of abrasive laden cord per square inch of the opposed sandwiching surfaces.

* * * * *